(12) United States Patent
Nakamura et al.

(10) Patent No.: US 8,774,241 B2
(45) Date of Patent: Jul. 8, 2014

(54) OPTICAL MODULE

(75) Inventors: Akira Nakamura, Tokyo (JP);
Masamitsu Okamura, Tokyo (JP);
Keiichi Fukuda, Tokyo (JP); Chise Nanba, Tokyo (JP); Kazutaka Ikeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 282 days.

(21) Appl. No.: 12/864,694

(22) PCT Filed: Mar. 18, 2008

(86) PCT No.: PCT/JP2008/054956
§ 371 (c)(1),
(2), (4) Date: Jul. 27, 2010

(87) PCT Pub. No.: WO2009/116131
PCT Pub. Date: Sep. 24, 2009

(65) Prior Publication Data
US 2010/0309946 A1     Dec. 9, 2010

(51) Int. Cl.
*H01S 3/04* (2006.01)
(52) U.S. Cl.
USPC .................. 372/36; 372/34; 372/35
(58) Field of Classification Search
CPC ....... H01S 3/025; H01S 3/042; H01S 3/0092; H01S 3/09415
USPC ................... 372/21, 22, 34, 36, 35
See application file for complete search history.

(56) References Cited

U.S. PATENT DOCUMENTS

| 4,847,851 | A | | 7/1989 | Dixon | |
|---|---|---|---|---|---|
| 5,745,623 | A | * | 4/1998 | Ohtomo et al. | 385/88 |
| 5,848,092 | A | | 12/1998 | Mitsumoto et al. | |
| 5,872,803 | A | | 2/1999 | Mori et al. | |

(Continued)

FOREIGN PATENT DOCUMENTS

| JP | 05-289132 A | 11/1993 |
|---|---|---|
| JP | 09-293917 A | 11/1997 |

(Continued)

OTHER PUBLICATIONS

International Search Report for PCT/JP2008/054956, completed Jun. 16, 2008.

(Continued)

*Primary Examiner* — Tod T Van Roy
(74) *Attorney, Agent, or Firm* — Buchanan Ingersoll & Rooney PC

(57) ABSTRACT

To constitute an optical module comprising a mount and a board that supports the mount, wherein a solid-state laser device that oscillates fundamental laser light, a pump light source that pumps the solid-state laser device, and a wavelength converting device that converts a wavelength of the fundamental laser light oscillated by the solid-state laser device are mounted on the mount, the mount is divided into three blocks, that is, a first block on which a laser medium is mounted, a second block on which the pump light source is mounted, and a third block on which the wavelength converting device is mounted. A side surface or a bottom surface of only the second block is fixed to the board, the first block is fixed to the other side surface of the second block, and the third block is fixed to a side surface of the first block.

9 Claims, 4 Drawing Sheets

(56) References Cited

U.S. PATENT DOCUMENTS

| | | | |
|---|---|---|---|
| 6,072,815 A * | 6/2000 | Peterson | 372/36 |
| 6,101,201 A | 8/2000 | Hargis et al. | |
| 6,130,902 A * | 10/2000 | Shimoji | 372/34 |
| 6,240,113 B1 | 5/2001 | Peterson | |
| 2004/0182929 A1 | 9/2004 | Aoshima et al. | |
| 2005/0063441 A1 | 3/2005 | Brown | |
| 2007/0121689 A1 * | 5/2007 | Brown | 372/39 |
| 2007/0230519 A1 * | 10/2007 | Heo et al. | 372/22 |

FOREIGN PATENT DOCUMENTS

| | | |
|---|---|---|
| JP | 2001-085767 A | 3/2001 |
| JP | 2003-46184 | 2/2003 |
| WO | WO 2005/030980 A2 | 4/2005 |

OTHER PUBLICATIONS

Written Opinion for PCT/JP2008/054956, completed Jun. 16, 2008 (in Japanese).

Czarske et al., "Birefringent Nd: YAG microchip laser used in heterodyne vibrometry", Optics Communications 114 (1995) 223-229.

Extended European Search Report dated Feb. 21, 2012 in corresponding European Application No. 08722350.9.

Japanese Office Action dated Mar. 6, 2012 in corresponding Japanese Application No. 2010-503685, and partial English translation thereof.

* cited by examiner

OPTICAL MODULE

TECHNICAL FIELD

The present invention relates to an optical module that converts fundamental laser light oscillated from a laser device into laser light having a predetermined wavelength by a wavelength converting device and outputs the laser light.

BACKGROUND ART

To obtain an optical module that oscillates green laser light of a wavelength 530-nm band, infrared laser light of a 1060-nm band is used as fundamental laser light, and the wavelength of the fundamental laser light is converted by a wavelength converting device in many cases. Therefore, the optical module that oscillates green laser light generally includes a solid-state laser device that oscillates fundamental laser light, a pump light source that pumps the solid-state laser device, and a wavelength converting device.

According to the optical module, when a light loss in a laser resonator that constitutes the solid-state laser device is increased, a heating value of the optical module is increased and the performance thereof is degraded. Therefore, to achieve an output increase of the optical module, it is essential to reduce the light loss in the laser resonator, and thus it is necessary to enhance alignment precision between an optical axis of the solid-state laser device and that of the wavelength converting device.

Although it is not an optical module of the above type, according to an integral semiconductor laser light source/optical waveguide apparatus described in Patent Document 1, for example, a distance from a surface of an optical waveguide device in which an optical waveguide is formed to a center axis of a light-incident end of the optical waveguide, and a distance from a surface of a semiconductor laser to a center axis of a light-emitting end are set equal to each other. With this configuration, a position of an axis of the optical waveguide device and a position of an axis of the semiconductor laser can be precisely set. According to this optical waveguide apparatus, the optical waveguide device and the semiconductor laser are placed side-by-side on a common board and fixed thereto by a bonding material such as an adhesive and solder.

In an electro-optical system described in Patent Document 2, a first submount and a second submount are provided in a separated manner, a secondary heat sink is mounted on the first submount, an active gain medium (such as laser and crystal) is provided such that the active gain medium protrudes over the first submount from the secondary heat sink, and a pump source (a laser diode) for the active gain medium is mounted on a sidewall of the second submount on the side facing the first submount. By placing the active gain medium and the pump source in this manner, a distance between the active gain medium and the pump source becomes precise. In the mode specifically described in the Patent Document 2, one end of the active gain medium is engaged with a recess formed on an upper surface of the second submount.
Patent Document 1: Japanese Patent Application Laid-open No. H05-289132
Patent Document 2: Japanese Patent Application Laid-open No. 2001-085767

DISCLOSURE OF INVENTION

Problem to be Solved by the Invention

For example, when a laser resonator is constituted by combining a solid-state laser device and a wavelength converting device with each other in such a manner that the alignment precision between optical axes thereof becomes on the micrometer order or on the sub-micrometer order, a light loss in the laser resonator is largely reduced, and thus an optical module having high output intensity can be obtained.

However, for example, when the solid-state laser device and the wavelength converting device are fixed to a common board by a bonding material as in the fixing method between the optical waveguide device and the semiconductor laser in the optical waveguide apparatus described in Patent Document 1, it is made difficult to obtain a member machining precision on the sub-micrometer order, and difficult to precisely manage the thickness of the bonding material. Therefore, it is difficult to enhance the alignment precision between the optical axis of the solid-state laser device and the optical axis of the wavelength converting device to the micrometer order or to the sub-micrometer order.

Further, when the solid-state laser device and the wavelength converting device are placed in proportion to a layout mode of the active gain medium and the pump source of the electro-optical system specifically described in Patent Document 2, because a relative position between the solid-state laser device and the wavelength converting device is restricted by a recess formed on the upper surface of the second submount, it is difficult to finely adjust the relative position. Therefore, it is difficult to enhance the alignment precision between the optical axis of the solid-state laser device and the optical axis of the wavelength converting device to the micrometer order or to the sub-micrometer order.

The present invention has been achieved in view of the above problems, and an object of the present invention is to obtain an optical module in which alignment precision between an optical axis of a solid-state laser device and an optical axis of a wavelength converting device can be easily enhanced.

Means For Solving Problem

In order to solve the aforementioned problems, an optical module according to the present invention is constructed in such a manner as to include a mount and a board that supports the mount, wherein a solid-state laser device that oscillates fundamental laser light, a pump light source that pumps the solid-state laser device, and a wavelength converting device that converts a wavelength of the fundamental laser light oscillated by the solid-state laser device are mounted on the mount, the mount is divided into three blocks, that is, a first block on which a laser medium of the solid-state laser device is mounted, a second block on which the pump light source is mounted, and a third block on which the wavelength converting device is mounted, and either one of a side surface and a bottom surface of only the second block is fixed to the board, the first block is fixed to the other side surface of the second block, and the third block is fixed to a side surface of the first block.

Effect of the Invention

According to the optical module of the present invention, among the first block on which the laser medium of the solid-state laser device is mounted, the second block on which the pump light source is mounted, and the third block on which the wavelength converting device is mounted, only the second block is fixed to the board. Therefore, it becomes easy to adjust a relative position of the first block and the third block with respect to the second block. Therefore, it is also easy to align optical axes of at least the laser medium and the wavelength converting device by active alignment with precision of the micrometer order to the sub-micrometer order. Even when a laser resonator for a solid-state laser device is constituted by using the laser medium and the wavelength converting device, it is possible to easily suppress a light loss in the laser resonator.

Therefore, according to the present invention, it is possible to obtain an optical module in which alignment precision between the optical axis of the solid-state laser device and the optical axis of the wavelength converting device can be easily enhanced, and it becomes easy to obtain a high-output optical module that oscillates laser light of a desired wavelength.

Figure 1:
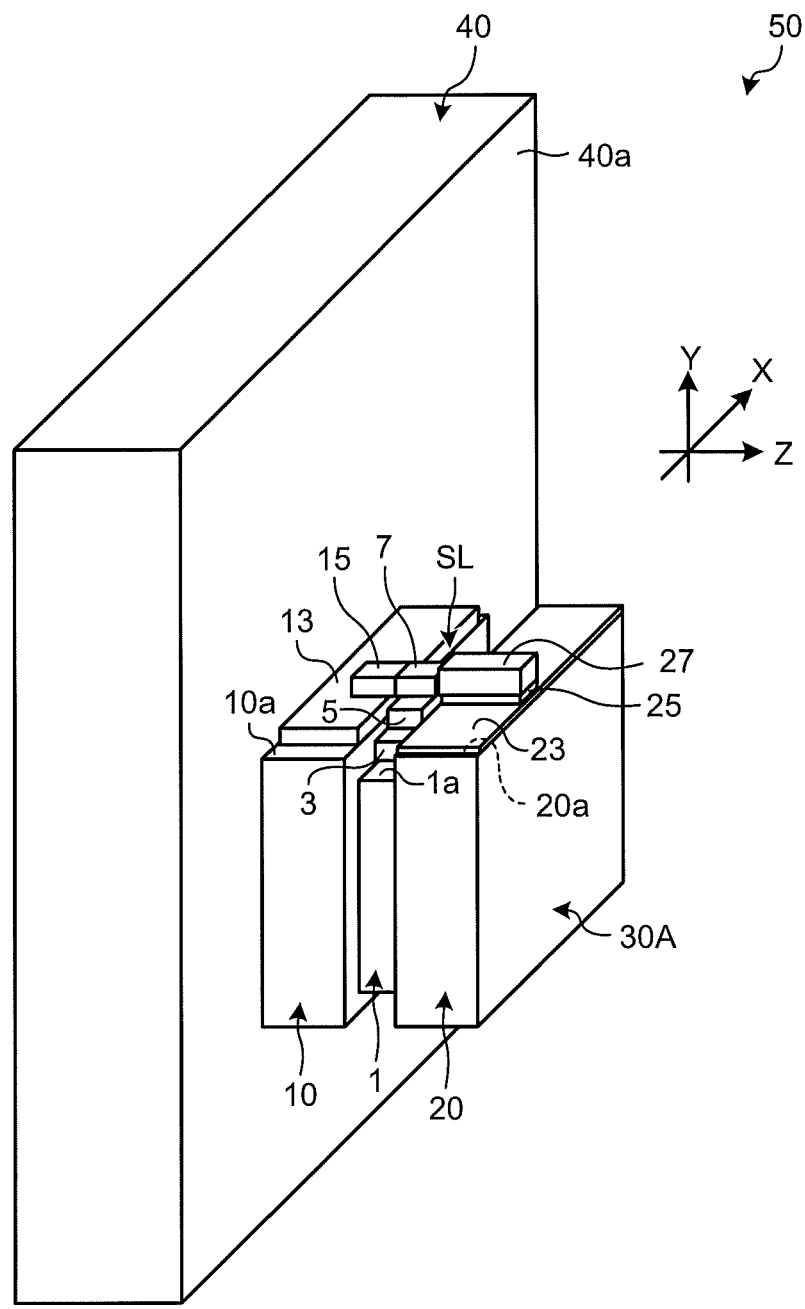
FIG. 1 is a schematic perspective view of an example of an optical module according to the present invention.

EXPLANATIONS OF LETTERS OR NUMERALS 1, 1A First block
7, 7A Laser medium
10, 10A Second block
15, 15A Semiconductor laser device 15
20, 20A Third block
27, 27A Wavelength converting device
30A, 30B Mount
40 Board
50, 50A Optical module
110 Second block
113 Light guide
150 Optical module
LR Laser resonator
SL Solid-state laser device
SLA Solid-state laser array

BEST MODE(S) FOR CARRYING OUT THE INVENTION

Exemplary embodiments of an optical module according to the present invention will be explained below in detail with reference to the accompanying drawings. The present invention is not limited to the embodiments.

First Embodiment

FIG. 1 is a schematic perspective view of an example of an optical module according to the present invention. An optical module 50 shown in FIG. 1 includes a mount 30A and a board 40. The mount 30A is divided into three blocks, that is, a first block 1, a second block 10, and a third block 20.

A thin plate-like stress buffering member 3 is fixed to an upper surface 1a of the first block 1 by a bonding material (not shown). A heat sink 5 is fixed to the stress buffering member 3 by a bonding material (not shown). A laser medium 7 is fixed to the heat sink 5 by a bonding material (not shown). The first block 1 is a flat plate-like member having two side surfaces intersecting with an optical axis of the laser medium 7, and the first block 1 is made of metal or alloy. The stress buffering member 3 relaxes a thermal stress generated by a difference in coefficient of linear expansion between the first block 1 and the heat sink 5.

The heat sink 5 of the first block 1 forms a heat distribution of a predetermined pattern in the laser medium 7 when the optical module 50 operates, exhibits a lens effect by the heat distribution, and suppresses light diffusion in the laser medium 7. In order thereto, a comb-shaped bonding part having a plurality of bonding surfaces is formed on the heat sink 5 on the side facing the laser medium 7. The laser medium 7 is a waveguide-type laser medium used for a solid-state laser device, and includes one optical waveguide that oscillates fundamental laser light. When the optical module 50 is a module that oscillates green laser light, the optical waveguide is formed by a laser medium such as $Nd:YVO_3$ (neodymium-doped yttrium vanadic acid). The laser medium 7 constitutes a solid-state laser device SL together with a laser resonator LR (described later).

A submount 13 is fixed to an upper surface 10a of the second block 10 by a bonding material (not shown). A semiconductor laser device 15 is fixed to the submount 13 by a bonding material (not shown). The semiconductor laser device 15 has such characteristics that when it is heated to a high temperature by its self-heating, its light-emitting efficiency is abruptly degraded and the lifetime thereof is reduced. Therefore, the second block 10 is made of copper or a copper-based material such as copper tungsten, and functions as a heat sink. The second block 10 is a flat plate-like member, and has two side surfaces intersecting with an optical axis of the semiconductor laser device 15.

The submount 13 is made of an electrical insulating material, and relaxes a thermal stress generated between the second block 10 and the semiconductor laser device 15 caused by a difference in coefficient of linear expansion between the second block 10 and the semiconductor laser device 15. The semiconductor laser device 15 is connected to an external circuit (not shown), and functions as a pump light source that emits pump light of the solid-state laser device SL. When the optical waveguide of the laser medium 7 is made of $Nd:YVO_3$, for example, a laser device that oscillates near-infrared laser light of a wavelength 800-nm band is used as the semiconductor laser device 15.

A temperature controller 23 is fixed to an upper surface 20a of the third block 20 by a bonding material (not shown). A temperature equalizing plate 25 is fixed to the temperature controller 23 by a bonding material (not shown). A wavelength converting device 27 is fixed to the temperature equalizing plate 25 by a bonding material (not shown). The third block 20 is a flat plate-like member having two side surfaces intersecting with an optical axis of the wavelength converting device 27. The third block 20 is made of a copper-based material, metal or alloy having a larger thermal resistance than that of the copper-based material, such as stainless steel. If the third block 20 is made of metal or alloy having a larger thermal resistance than that of the copper-based material, the temperature controller 23 can easily control the temperature of the wavelength converting device 27.

The temperature controller 23 is constituted by using a heating element, and controls a temperature of the wavelength converting device 27 to a predetermined value. The temperature controller 23 is connected to an external circuit (not shown). The temperature equalizing plate 25 is made of metal or alloy having an excellent thermal conductivity such as copper and aluminum, and equalizes a temperature distribution of bonding surfaces between the temperature equalizing plate 25 and the wavelength converting device 27 such that the temperature of the wavelength converting device 27 is impartially controlled by the temperature controller 23. The wavelength converting device 27 is a waveguide-type device having an optical waveguide made of a non-linear optical material such as potassium niobic acid ($KNbO_3$) and lithium niobic acid ($LiNbO_3$), and its wavelength converting efficiency has temperature dependence. Therefore, the wavelength converting device 27 is held at a predetermined temperature by the temperature controller 23.

The board 40 supports the first to third blocks 1, 10, and 20 mentioned above, and has a function as a stem if necessary. In the optical module 50 shown in FIG. 1, only the second block 10 is fixed to a main surface 40a of the board 40 by a bonding material (not shown).

Figure 2:
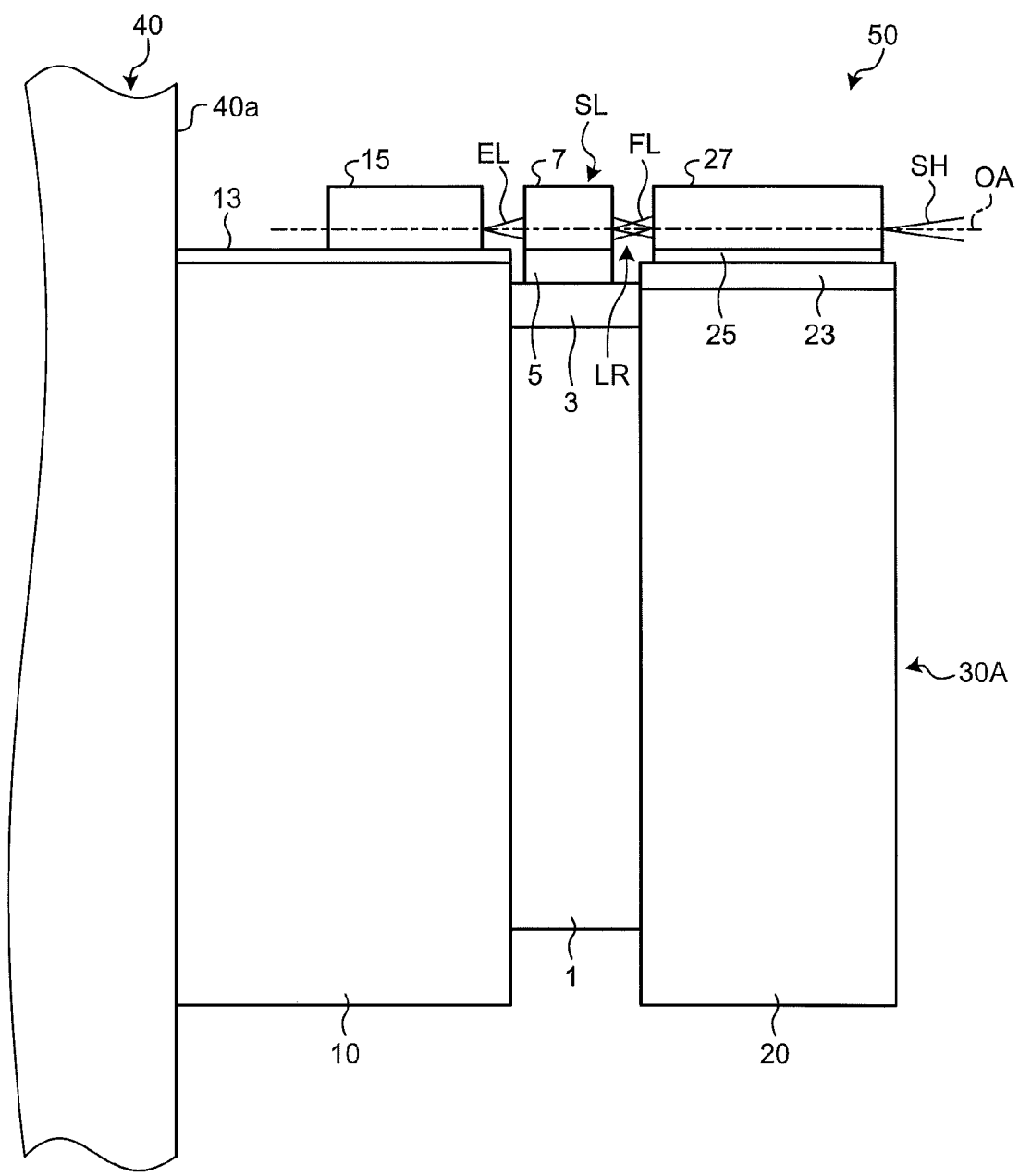
FIG. 2 is a schematic side view of the optical module shown in FIG. 1.

FIG. 2 is a schematic side view of the optical module shown in FIG. 1. As shown in FIG. 2, in the optical module 50, one of the two side surfaces of the second block 10 in perpendicular to the optical axis of the semiconductor laser device 15 is bonded to the main surface 40a of the board 40 by a bonding material (not shown), and one of the two side surfaces of the first block 1 in perpendicular to the optical axis of the laser medium 7 is bonded to the other side surface of the second block 10 by a bonding material (not shown). One of the two side surfaces of the third block 20 in perpendicular to the optical axis of the wavelength converting device 27 is fixed to the other one of the two side surfaces of the first block 1 in perpendicular to the optical axis of the laser medium 7 by a bonding material (not shown). It is to be noted that the optical axis of the laser medium 7 is an optical axis of an optical waveguide formed in the laser medium 7, and the optical axis of the wavelength converting device 27 is an optical axis of an optical waveguide formed in the wavelength converting device 27.

The blocks 1, 10, and 20 are placed such that their upper surfaces 1a, 10a, and 20a are oriented to the same direction so that pump light emitted from the semiconductor laser device 15 enters the optical waveguide (not shown) of the laser medium 7 and fundamental laser light oscillated by the solid-state laser device SL enters the optical waveguide (not shown) of the wavelength converting device 27. A light-emitting end of the semiconductor laser device 15 is on the side facing the laser medium 7, and a light-emitting end of the laser medium 7 is on the side facing the wavelength converting device 27.

Optical thin films that function as resonator mirrors are provided on each of a light-incident end of the optical waveguide of the laser medium 7 and a light-incident end of the optical waveguide of the wavelength converting device 27. These optical thin films form the laser resonator LR. The laser resonator LR and the optical waveguide of the laser medium 7 constitute the solid-state laser device SL.

In the optical module 50 constituted as described above, pump light EL oscillated by the semiconductor laser device 15 enters the optical waveguide of the laser medium 7, and the fundamental laser light FL is oscillated from the optical waveguide. Reflection of the fundamental laser light FL is repeated in the laser resonator LR and the fundamental laser light FL is amplified, a part thereof enters the optical waveguide of the wavelength converting device 27 and its wavelength is converted, the fundamental laser light FL finally becomes a second harmonic SH, and it is emitted from the wavelength converting device 27. When the fundamental laser light oscillated by the laser medium 7 is infrared laser light of a 1060-nm band, green laser light of a 530-nm band that is the second harmonic SH can be obtained.

An XYZ coordinate system (see FIG. 1) is assumed in which directions of the optical axes of the laser medium 7, the semiconductor laser device 15, and the wavelength converting device 27 are Z-axis and height directions of the blocks 1, 10, and 20 are Y-axis. Because only the second block 10 is fixed to the board 40, when the optical module 50 is to be assembled, any of the first block 1 and the third block 20 can be freely displaced in any of an X-axis direction, a Y-axis direction, and a Z-axis direction outside the second block 10. The relative position of the first block 1 with respect to the second block 10 and the relative position of the third block with respect to the first block 1 can be freely adjusted.

At this time, because the side surface of the first block 1 on the side of the second block 10 is in perpendicular to the optical axis of the laser medium 7 and the side surface of the second block 10 on the side of the first block 1 is in perpendicular to the optical axis of the semiconductor laser device 15, it is easy to suppress the inclination of the first block 1 within an X-Y plane. Similarly, because the side surface of the first block 1 on the side of the third block 20 is in perpendicular to the optical axis of the laser medium 7 and the side surface of the third block 20 on the side of the first block 1 is in perpendicular to the optical axis of the wavelength converting device 27, it is easy to suppress the inclination of the third block 20 within the X-Y plane.

Therefore, the light-incident end and the light-emitting end of the laser medium 7 are previously formed such that these ends intersect with the optical axis of the laser medium 7, the light-emitting end of the semiconductor laser device 15 is previously formed such that the end intersects with the optical axis of the semiconductor laser device 15, and the light-incident end of the wavelength converting device 27 is previously formed such that the end intersects with the optical axis of the wavelength converting device 27. With this configuration, it becomes easy to precisely perform active alignment between the semiconductor laser device 15 and the laser medium 7, and active alignment between the laser medium 7 and the wavelength converting device.

For example, it is easy to enhance the alignment precision between the optical axis of the laser medium 7 and the optical axis of the wavelength converting device 27 to the micrometer order or to the sub-micrometer order. When the alignment precision is enhanced to the micrometer order or to the sub-micrometer order, because the light loss in the laser resonator LR (see FIG. 2) is largely reduced, the output intensity of the optical module 50 is enhanced. It becomes easy to obtain a high-output optical module that oscillates laser light of a desired wavelength, such as green laser light.

It is easy to enhance the alignment precision between the optical axis of the semiconductor laser device 15 and the optical axis of the laser medium 7. Even when the oscillating position of the semiconductor laser device 15 to be used is varied due to variation caused when the semiconductor laser device 15 is manufactured, the semiconductor laser device 15 and the laser medium 7 can be aligned with each other according to the oscillating position of the semiconductor laser device 15 by appropriately adjusting the relative position of the first block 1 with respect to the second block 10. Therefore, in the optical module 50, it is easy to position the optical axis of the semiconductor laser device 15, the optical axis of the laser medium 7, and the optical axis of the wavelength converting device 27, on one optical axis OA (see FIG. 2). It is also easy to downsize the optical module 50.

Second Embodiment

The optical module according to the present invention can be formed into a multi-emitter. When the optical module is formed into the multi-emitter, a laser medium having a plurality of optical waveguides is mounted on the upper surface of the first block, a plurality of pump light sources are mounted on the upper surface of the second block, one wavelength converting device in which a plurality of wavelength converting devices or a plurality of optical waveguides are formed is mounted on the upper surface of the third block, wherein the second block is fixed to the board, and the remaining two blocks are fixed to the second block with a predetermined arrangement.

Figure 3:
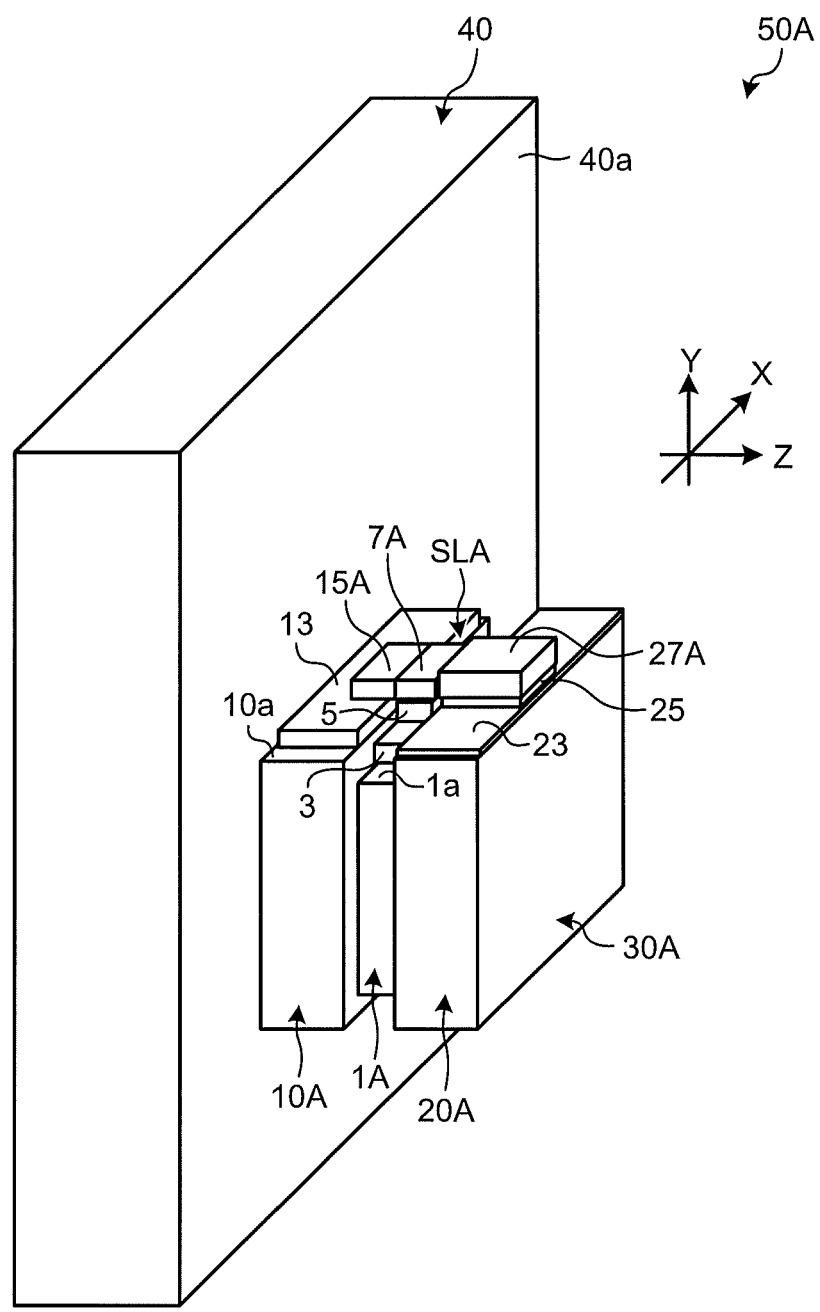
FIG. 3 is a schematic perspective view of an example of an optical module that is formed into a multi-emitter, among optical modules according to the present invention.

FIG. 3 is a schematic perspective view of an example of an optical module that is formed into a multi-emitter. An optical module 50A shown in FIG. 3 has the same configuration as that of the optical module 50 shown in FIG. 1, except that the optical module 50A includes a first block 1A, a second block 10A, and a third block 20A instead of the first block 1, the second block 10, and the third block 20 shown in FIG. 1.

The first block 1A has the same configuration as that of the first block 1 shown in FIG. 1, except that the first block 1A includes a waveguide-type solid-state laser medium 7A having a plurality of optical waveguides instead of the laser medium 7 shown in FIG. 1. The second block 10A has the same configuration as that of the second block 10 shown in FIG. 1, except that the second block 10A includes a semiconductor laser device 15A having a plurality of laser oscillators instead of the semiconductor laser device 15 shown in FIG. 1. The third block 20A has the same configuration as that of the third block 20 shown in FIG. 1, except that the third block 20A includes a waveguide-type wavelength converting device 27A having a plurality of optical waveguides instead of the wavelength converting device 27 shown in FIG. 1. Among constituent elements shown in FIG. 3, elements identical to those shown in FIG. 1 are denoted by like reference letters or numerals used in FIG. 1, and explanations thereof will be omitted.

The laser oscillators in the semiconductor laser device 15A oscillate pump light for the laser medium 7A. The pump light emitted from the laser oscillators in the semiconductor laser device 15A enters the optical waveguides in the laser medium 7A. The fundamental laser light emitted from the optical waveguides in the laser medium 7A is amplified by a laser resonator (not shown), and enters the optical waveguides in the wavelength converting device 27A. That is, the optical module 50A includes a solid-state laser array SLA instead of the solid-state laser device SL shown in FIG. 1, and emits plural sets of laser light of a predetermined wavelength.

Also in the optical module 50A having the configuration described above, the optical waveguides of the laser medium 7A, the laser oscillators of the semiconductor laser device 15A, and the optical waveguides of the wavelength converting device 27A are formed with predetermined precision. With this configuration, identical technical effects as those of the optical module 50 shown in FIG. 1 can be obtained for the same reason as that of the optical module 50. It becomes easy to obtain a high-output optical module that oscillates laser light of a desired wavelength, for example, green laser light. It is also made easy to downsize the optical module 50A.

Third Embodiment

In the optical module according to the present invention, it is possible to use a light guide that receives pump light from an external light source and emits the pump light toward the laser medium as a pump light source of the laser medium.

Figure 4:
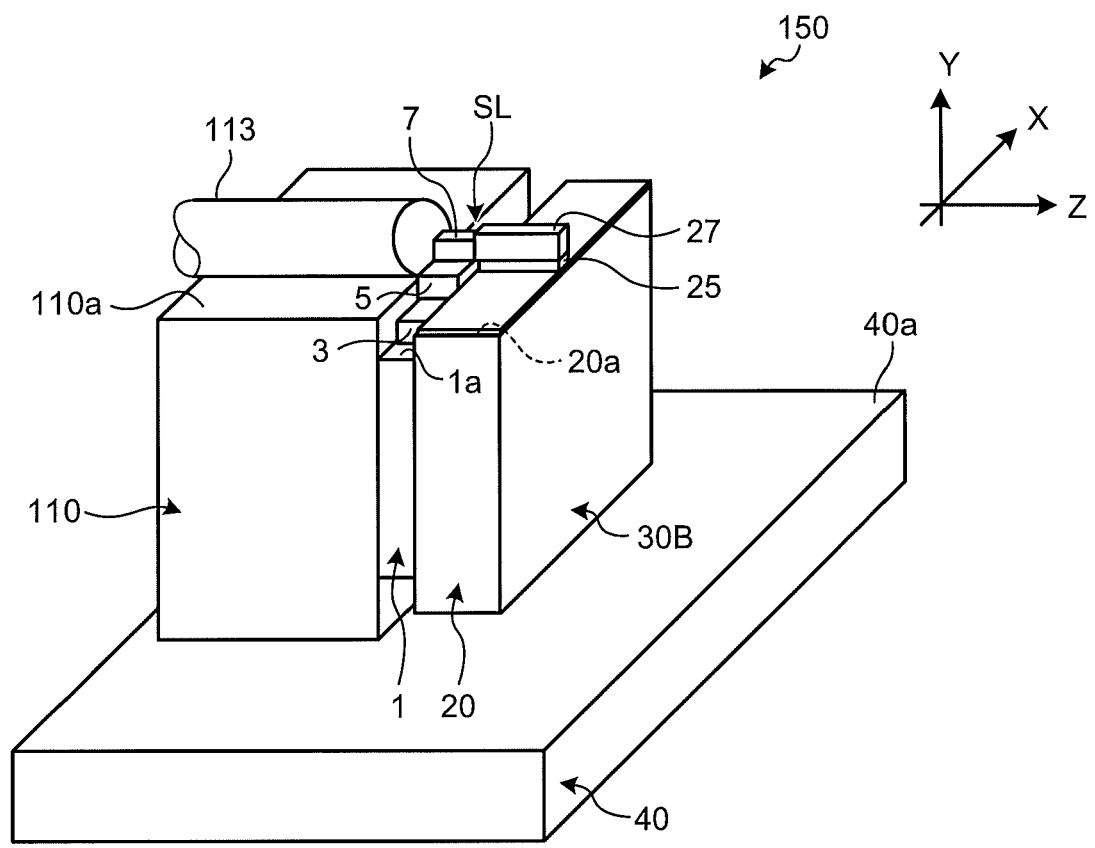
FIG. 4 is a schematic perspective view of an example of an optical module having a light guide as a pump light source of a laser medium, among optical modules according to the present invention.

FIG. 4 is a schematic perspective view of an example of an optical module having a light guide as a pump light source of a laser medium. An optical module 150 shown in FIG. 4 has the same configuration as that of the optical module 50 shown in FIG. 1, except that the optical module 150 includes a mount 30B having a second block 110 instead of the second block 10 shown in FIG. 1, and that a bottom surface of the second block 110 is fixed to the board 40. Among constituent elements shown in FIG. 4, elements identical to those shown in FIG. 1 are denoted by like reference letters or numerals used in FIG. 1, and explanations thereof will be omitted.

A light guide 113 is fixed to an upper surface 110a of the second block 110 by a bonding material (not shown). The second block 110 is a flat plate-like member having two side surfaces intersecting with an optical axis of the pump light emitted from the light guide 113, and the second block 110 is made of metal or alloy, for example. The light guide 113 receives pump light for the laser medium 7 from an external light source (not shown) and emits the pump light toward the laser medium 7.

A bottom surface of the second block 110 is bonded to the main surface 40a of the board 40 by a bonding material (not shown), and the bottom surface is fixed to the board 40. One of two side surfaces of the first block 1 intersecting with the optical axis of the laser medium 7 is bonded to one of two side surfaces of the second block 110 intersecting with the optical axis of the pump light emitted from the light guide 113 by a bonding material (not shown). One of two side surfaces of the third block 20 intersecting with the optical axis of the wavelength converting device 27 is fixed to the other one of the two side surfaces of the first block 1 intersecting with the optical axis of the laser medium 7 by a bonding material (not shown).

Also in the optical module 150 having the configuration described above, identical technical effects as those of the optical module 50 shown in FIG. 1 can be obtained by the same reason as that of the optical module 50. It becomes easy to obtain a high-output optical module that oscillates laser light of a desired wavelength, such as green laser light. It is also easy to downsize the optical module 150.

While the optical module according to the present invention has been explained above by exemplary embodiments, as mentioned above, the present invention is not limited to these embodiments. For example, when a side surface of the first block on the side of the second block and a side surface of the second block on the side of the first block can easily place the upper surface of the first block and the upper surface of the second block on the same plane, or can easily bring these upper surfaces in parallel to each other, they do not need to intersect with the optical axis of the laser medium or the optical axis of the pump light, and can incline by a predetermined angle.

Similarly, when a side surface of the first block on the side of the third block and a side surface of the third block on the side of the first block can easily place the upper surface of the first block and the upper surface of the third block on the same plane, or can easily bring these upper surfaces in parallel to each other, they do not need to intersect with the optical axis of the laser medium or the optical axis of the wavelength converting device, and can incline by a predetermined angle.

To obtain a downsized and high-output optical module that oscillates green laser light, it is preferable to use a waveguide-type wavelength converting device. However, it is also possible to use a wavelength converting device of a type other than the waveguide type, depending on the performance required for the optical module. The same can apply to the laser medium. The structure of the laser resonator can be appropriately changed. It is also possible to appropriately select as to which one of the first to third blocks is to be fixed to a board. As for the optical module according to the present invention, various changes, modifications, and combinations other than those described above can be made.

INDUSTRIAL APPLICABILITY

The optical module according to the present invention can be used as an optical module that constitutes a light source of an image display apparatus such as a laser television and a projector, and of a printing apparatus such as a laser printer. The optical module can be also used as an alternative to laser oscillators that are generally used for industrial and business purpose.

The invention claimed is:

1. An optical module comprising:
   a board;
   a mount that is cantilevered from the board;
   a solid-state laser device for oscillating fundamental laser light;
   a pump light source that pumps the solid-state laser device; and
   a wavelength converting device that converts a wavelength of the fundamental laser light oscillated by the solid-state laser device,
   wherein the solid-state laser device, the pump light source and the wavelength converting device are each mounted on the mount,
   the mount being divided into three blocks, a first block on which a laser medium of the solid-state laser device is mounted, the first block having two side surfaces perpendicular to an optical axis of the laser medium, a second block on which the pump light source is mounted, the second block having two side surfaces perpendicular to an optical axis of the pump light source and a third block on which the wavelength converting device is mounted, the third block having two side surfaces perpendicular to an optical axis of the wavelength converting device, and
   wherein either one of a side surface and a bottom surface of only the second block is fixed to the board, the first block is fixed to the other side surface of the second block, and the third block is fixed to a side surface of the first block, wherein the optical axes coincide with each other and when the optical module is to be assembled, each of the first block and the third block is freely displaceable in any of an X axis direction, a Y axis direction and a Z axis direction outside the second block.

2. The optical module according to claim 1, wherein a side surface of the first block on a side facing the third block is in parallel to a side surface of the third block on a side facing the first block.

3. The optical module according to claim 1, wherein a side surface of the first block on a side facing the second block is in parallel to a side surface of the second block on a side facing the first block.

4. The optical module according to claim 1, wherein the pump light source is a semiconductor laser device.

5. The optical module according to claim 1, wherein the pump light source is a light guide that receives the pump light from an external light source and that emits the pump light toward the laser medium.

6. The optical module according to claim 1, wherein the laser medium is a waveguide-type laser medium.

7. The optical module according to claim 1, wherein the wavelength converting device is a waveguide-type wavelength converting device.

8. The optical module according to claim 1, comprising a submount fixed to an upper surface of the second block, the pump light source being mounted on the submount and the submount being made of an electrical insulating material and relaxing a thermal stress generated between the second block and the pump light source.

9. The optical module according to claim 1, wherein the second block is formed of copper or copper-based material, and the third block is formed of a copper-based material, metal or alloy having a larger thermal resistance than the material forming the second block.

* * * * *